United States Patent Office 2,797,217
Patented June 25, 1957

2,797,217

DIHYDRO OXAZINE DIONES

Sidney Robert Safir, River Edge, N. J., and Rocco Joseph Lopresti, Brooklyn, N. Y., assignors to American Cyanamid Company, New York, N. Y., a corporation of Maine No Drawing. Application May 13, 1955,
Serial No. 508,312

9 Claims. (Cl. 260—244)

This invention relates to a series of new organic compounds. More particularly, this invention is concerned with certain dihydro-1,3-oxazine-2,4(3H)-diones, salts thereof and methods for their preparation. This is a continuation-in-part of our copending U. S. application S. N. 438,864, filed June 23, 1954 now abandoned.

We have discovered that certain dihydro-1,3-oxazine-2,4(3H)-diones possess pharmacological properties which make them useful as therapeutic agents. These compounds may be used as sedatives, hypnotics, anticonvulsants, and central nervous system depressants.

The dihydro-1,3-oxazine-2,4(3H)-diones of this invention are administrable by intravenous, intramuscular or intraperitoneal injection. The dosage required to produce surgical anaesthesia of from 15 minutes to 90 minutes duration without noticeable toxic side effects varies between 25 mg. and 200 mg. per kilogram of body weight. In general, the compounds are most useful in the form of their alkali metal salts since it is in this form that they are water soluble. Depending upon the nature of the substituent groups present on the nucleus, certain of these salts are capable of inducing deep anesthesia of short duration, followed by rapid recovery. In this respect, they are particularly advantageous as intravenous anaesthetics.

In appropriate dosage, the compounds of this invention exert anticonvulsant activity. Because of this property, they are potentially beneficial in the treatment of epilepsy. Their sedative and hypnotic properties are evidenced by their ability to potentiate the sleep-producing properties of the barbiturates by lengthening the duration of sedation.

The new compounds of this invention have the following general formula:

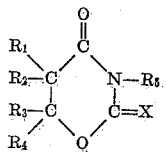

wherein $R_1$, $R_2$, $R_3$ and $R_4$ represent, interchangeably, hydrogen, lower alkyl, mononuclear aryl, substituted mononuclear aryl, aralkyl, alkaryl, alkenyl, cycloalkyl, cycloalkenyl, cycloalkylene or heterocyclic substituents, with the requirement that at least one of the four is not hydrogen; $R_5$ is hydrogen or a lower alkyl radical, or in the case of the salts, another cation, and X is an oxygen or sulfur atom. As representative examples of each of the aforementioned substituents may be given the following: methyl, ethyl, propyl, isopropyl, butyl, isobutyl, amyl, isoamyl, hexyl, phenyl, chlorophenyl, isopropylphenyl, vinyl, benzyl, phenylethyl, tolyl, pentamethylene, cyclohexyl, 2-thienyl, 2-pyridyl, propenyl, 1-methylbutyl, 1-methylpropyl and 3-cyclohexen-1-yl.

To prepare the dihydro-1,3-oxazine-2,4(3H)-diones of the present invention, several methods may be employed. However, we have discovered a particularly useful and novel process and it is intended that this process be embraced within the scope of the present invention. Our process involves three interdependent steps. In the first step, an ester of a correspondingly substituted β-hydroxypropionic acid is reacted with phosgene or thiophosgene to yield the corresponding chloroformyloxy or chlorothioformyloxy derivative, in accordance with the following equation:

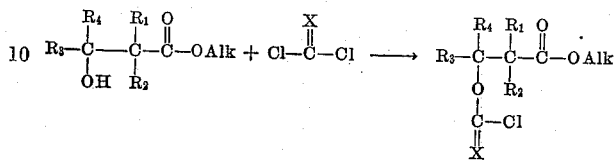

wherein Alk represents a lower alkyl radical such as methyl, ethyl, propyl, or butyl. This compound is then reacted with ammonia or a suitably substituted primary lower alkyl amine to yield:

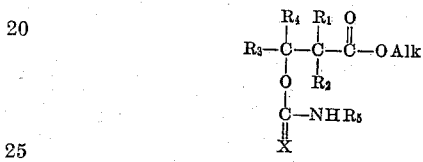

which is then condensed in the presence of a strong base such as an alkali metal alkoxide to yield the desired product.

The reaction between phosgene or thiophosgene and an appropriately substituted β-hydroxypropionic acid ester is preferably carried out in the presence of an inert, nonhydroxylic organic solvent such as for example, chloroform, benzene, ether, dioxane, toluene, or mixtures of chloroform and toluene. A suitable temperature for carrying out the reaction in the initial stage is between —20° C. and 30° C., about 0° C. being preferred. After a period of about 30 minutes to 2 hours, the mixture is allowed to warm up to room temperature to complete the reaction.

It is desirable that an acid acceptor be employed during the reaction to neutralize the free acid formed. For this purpose, we find any weak tertiary amine suitable such as for example, antipyrine, dimethylaniline, pyridine, quinoline and similar compounds. We prefer to use antipyrine.

Formation of the chloroformyloxy or chlorothioformyloxy derivative proceeds at a moderate rate, usually requiring from about 3 hours to 3 days to reach completion. No temperature control is required for the reaction, it being sufficient to allow the mixture to stand at room temperature.

The carbamyloxy or thiocarbamyloxy ester may be readily prepared from the corresponding chloroformyl ester by reacting the latter compound with ammonia or a suitably substituted primary amine. The ammonia may be introduced either in the gaseous or liquid state for such period of time until the uptake has ceased or until the mixture is weakly ammoniacal. Primary amines suitable for this reaction are the lower alkylamines such as methylamine and ethylamine.

The final step of the process comprises ring closure. This is preferably effected by reacting the carbamyloxy or thiocarbamyloxy ester with an alkali metal alkoxide in the presence of an organic solvent such as a lower alkyl alcohol—for example, methanol, ethanol, propanol or butanol. Suitable alkali metal alkoxides for this reaction are sodium methoxide and sodium ethoxide.

The time required for the ring closure reaction to take place varies between wide limits—from 15 seconds to 1 day. Generally, about 5 minutes to 3 hours is sufficient.

Most of the dihydro-1,3-oxazine-2,4(3H)-diones of this invention are white crystalline solids, some being oils. The solids are readily soluble in warm alcohol but insoluble in water. They form water-soluble metallic salts with such metals as potassium, sodium, calcium and the like, the cation being linked to the anion of the ring compound in the 3-position.

The following examples are illustrative of the compounds and processes which are intended to be embraced within the scope of the present invention. The specific compounds set forth are not to be construed as limitative. All parts are by weight unless otherwise indicated.

*Example I*

To a solution of 4.4 parts by weight of phosgene in 50 parts by volume of toluene is added drop-wise, while the temperature is maintained between −10° C. and 0° C., a solution of 10 parts by weight of ethyl 2,2-dimethyl-3-phenylhydracrylate (Organic Synthesis, vol. 21, page 53) and 8.5 parts by weight of antipyrine in 70 parts by volume of chloroform. Stirring is continued during the addition which requires about 90 minutes. The reaction mixture is allowed to warm to room temperature and left for 3 days. The mixture is concentrated under vacuum to a residual oily solid. This residue is extracted with ether and filtered. The filtrate is concentrated to yield (2 - carbethoxy - 2 - methyl - 1 - phenyl)propyl chloroformate.

A quality of 12 parts by weight of (2-carbethoxy-2-methyl-1-phenyl)propyl chloroformate is dissolved in 75 parts by volume of chloroform. The solution is cooled to −10° C. and gaseous ammonia is bubbled through the solution until it is weakly alkaline. The mixture is filtered and the filtrate is concentrated under reduced pressure to yield (2-carbethoxy-2-methyl-1-phenyl)propyl carbamate, melting at 95° C. to 118° C. Recrystallization from butanol gives a product melting at 125° C. to 128° C.

A quantity of 4.1 parts by weight of (2-carbethoxy-2-methyl-1-phenyl)propyl carbamate is dissolved in 90 parts by volume of absolute methanol. This solution is added at room temperature to a solution of 0.85 part by weight of sodium methoxide in 10 parts by volume of methanol. The reaction mixture is left at room temperature for 3 hours, after which time 150 parts by volume of dilute aqueous hydrochloric acid (equivalent to 25 parts by volume of 1 N hydrochloric acid) is added. The precipitate is filtered and dried, yielding dihydro-5,5-dimethyldihydro - 6 - phenyl - 1,3 - oxazine - 2,4(3H) - dione, melting at 151° C. to 164° C. A small sample of the crude product is recrystallized from absolute ethanol, yielding a material melting at 166° C. to 168° C.

*Example II*

To 150 parts by volume of toluene containing 25 parts by weight of phosgene at −10° C. is added drop-wise with stirring, a solution containing 150 parts by volume of chloroform, 48.2 parts by weight of antipyrine and 64 parts by weight of ethyl 2,2-diethyl-3-phenylhydracrylate (J. A. C. 72, 3716, 1950). The mixture is permitted to stand for 3 days at room temperature, whereupon the mixture is filtered. The filtrate is evaporated under reduced pressure to yield (2-carbethoxy-2-ethyl-1-phenyl)butyl chloroformate.

To a quantity of 200 parts by volume of chloroform containing 74.2 parts by weight of (2-carbethoxy-2-ethyl-1-phenyl)butyl chloroformate at −10° C. is added gaseous ammonia until the uptake of ammonia ceases. The mixture is warmed to room temperature and filtered. The filtrate is concentrated to yield an oily solid. The crude solid is recrystallized from petroleum ether to yield (2-carbethoxy - 2 - ethyl - 1 - phenyl)butyl carbamate. A small sample of this material recrystallized from petroleum ether for analysis yields a product having a melting point of 86° C. to 88° C.

To a solution of 20 parts by volume of anhydrous methanol containing 20 parts by weight of (2-carbethoxy-2-ethyl-1-phenyl)butyl carbamate is added a solution of 3.9 parts by weight of sodium methoxide in 25 parts by volume of anhydrous methanol. The solution is permitted to stand for 2½ hours at room temperature and is then added to 72 parts by volume of 1 N hydrochloric acid. The resulting solid precipitate is filtered and washed with water to yield 5,5-diethyldihydro-6-phenyl-1,3-oxazine-2,4(3H)-dione having a melting point of 140° C. to 156° C. A sample of the crude solid when recrystallized from ethanol yields a product having a melting point of 163° C. to 166° C.

*Example III*

To a solution of 200 parts by volume of toluene containing 50.6 parts by weight of phosgene at −10° C. is added drop-wise and with stirring, a solution containing 200 parts by volume of chloroform, 100 parts by weight of ethyl 3-phenylhydracrylate (Organic Reactions, vol. 1, page 22, 1942) and 97 parts by weight of antipyrine. The reaction is permitted to stand at room temperature for 48 hours. The mixture is filtered and the filtrate is concentrated to yield a mixture of oil and solid, which is again filtered. Further concentration of the filtrate yields crude (2-carbethoxy-1-phenyl)ethyl chloroformate, obtained as an oil. To 115 parts by weight of this product in 250 parts by volume of chloroform is added gaseous ammonia at −10° C. until a slight excess of ammonia is present. The mixture is filtered and the filtrate is concentrated to yield 38.2 parts by weight of an oily solid. Recrystallization of the crude product from petroleum ether-ethanol yields (2-carbethoxy-1-phenyl)ethyl carbamate having a melting point of 79° C. to 83° C. To 2 parts by weight of (2-carbethoxy-1-phenyl)ethyl carbamate in 15 parts by volume of anhydrous methanol is added a solution of 0.45 part by weight of sodium methoxide in 15 parts by volume of methanol. The solution is permitted to stand at room temperature for about 5 minutes and is then poured into 8.6 parts by volume of 1 N hydrochloric acid with ice-cooling. The turbid solution is extracted with several portions of ether, which are evaporated to dryness under reduced pressure. The residue is an oily solid. The crude product is recrystallized twice from ethanol to yield dihydro-6-phenyl-1,3-oxazine-2,4(3H)-dione having a melting point of 149° C. to 153° C.

*Example IV*

To 36.8 parts by weight of phosgene dissolved in 200 parts by volume of toluene at −10° C. is added a solution of 120 parts by volume of chloroform containing 78 parts by weight of ethyl 2-methyl-3-phenylhydracrylate and 70.5 parts by weight of antipyrine, dropwise. The mixture is permitted to stand for 3 days at room temperature and then filtered. The solid residue is washed with ether and the filtrate is concentrated under reduced pressure to yield a mixture of an oil and a solid. The mixture is filtered and the solid residue is washed with a small amount of ether. The filtrate is concentrated to dryness to yield crude (2-carbethoxy-1-phenyl)-propyl chloroformate. To 97.4 parts by weight of this product in 250 parts by volume of chloroform is added gaseous ammonia until an excess of ammonia is present at −10° C. The mixture is permitted to warm to room temperature and the inorganic material is filtered. The filtrate is concentrated under reduced pressure to yield crude (2-carbethoxy-1-phenyl)propyl carbamate, melting point 60° C. to 70° C., which on recrystallization from petroleum ether-ethanol melts at 67° C. to 72° C.

To 3 parts by weight of (2-carbethoxy-1-phenyl)propyl carbamate in 15 parts by volume of anhydrous methanol is added a solution of 0.67 part by weight of sodium methoxide in 15 parts by volume of anhydrous methanol. The solution is permitted to stand for about 5 minutes and is then poured into a cold mixture of 12.5 parts by volume of 1 N hydrochloric acid and 25 parts by volume of water. The solution is extracted with ether and the dried ethereal extracts are evaporated under reduced pressure to yield an oil. Crystallization of this oil with ethanol yields an oily solid, which on recrystallization from ethanol, yields dihydro-5-methyl-6-phenyl-1,3-oxazine-2,4(3H)-dione, melting point 142° C. to 143° C.

*Example V*

To a solution of 50 parts by weight of ethyl 2-ethyl-3-phenylhydracrylate in 168 parts by volume of dry chloroform, cooled to −20° C. there is added 30 parts by weight of phosgene. A quantity of 44 parts by weight of antipyrine, dissolved in 200 parts by volume of chloroform, is added drop-wise during the course of about 30 minutes with stirring at −20° C. to this mixture. The resulting clear solution is then stored at room temperature for about 24 hours and then evaporated to dryness under reduced pressure to yield an oily solid. The latter is digested with dry ether and filtered from the resulting antipyrine hydrochloride. The ether solution, containing the desired (2-carbethoxy-1-phenyl)-butyl chloroformate, is treated with a slight excess of dry ammonia at 20° C. After filtration of the ammonium chloride, the ether solution is evaporated to dryness under reduced pressure to yield a crystalline residue consisting of the two racemic pairs corresponding to (2-carbethoxy-1-phenyl)butyl carbamate.

A solution of 37.3 parts by weight of the aforementioned carbamate in 250 parts by volume of dry methanol is treated with a solution of 30 parts by weight of sodium methoxide in 200 parts by volume of methanol. After storage at room temperature for about 20 minutes, the solution is poured into an ice-cold mixture of water and chloroform. After thorough mixing, the aqueous layer is separated and acidified to about pH 5. The resulting mixture is extracted with chloroform. After evaporation to dryness, a crystalline residue is obtained, consisting of the two racemic pairs corresponding to 5-ethyldihydro-6-phenyl-1,3-oxazine-2,4(3H)-dione. The mixture is separated by means of fractional crystallization from methanol and ethanol, into racemic pair A, melting point 170° C. to 172° C., and racemic pair B, melting point 150° C. to 152° C.

*Example VI*

To 58 parts by weight of zinc is added slowly a solution of 172 parts by weight of ethyl (2-bromo-2-methyl) butyrate and 95 parts by weight of benzaldehyde in 250 parts by volume of benzene and 50 parts by volume of ether with heating. The reaction mixture is decomposed with 10% sulfuric acid and the separated benzene layer is dried and concentrated under reduced pressure to yield an oil. Distillation of the oil yields ethyl (2-ethyl-2-methyl-3-phenyl)hydracrylate, boiling point 128° C. to 130° C. at 1.3 mm.

To 120 parts by weight of ethyl (2-ethyl-2-methyl-3-phenyl)hydracrylate in 325 parts by volume of chloroform is first added, at −20° C., 75 parts by weight of phosgene and then 96 parts by weight of antipyrine in 500 parts by volume of chloroform. The solution is permitted to stand overnight at room temperature and is then concentrated under reduced pressure to yield a mixture of oil and solid which is extracted with ether and filtered. The filtrate contains (2-carbethoxy-2-methyl-1-phenyl)butyl chloroformate.

To the crude (2-carbethoxy-2-methyl-1-phenyl)butyl chloroformate is added (in the cold) gaseous ammonia until a slight excess is present. The mixture is filtered and the ethereal filtrate is concentrated to yield (2-carbethoxy-2-methyl-1-phenyl)butyl carbamate as a solid, melting point 64° C. to 83° C.

To 87 parts by weight of (2-carbethoxy-2-methyl-1-phenyl)butyl carbamate in 200 parts by volume of methanol is added 17 parts by weight of sodium methoxide in 225 parts by volume of methanol. The solution is permitted to stand at room temperature for about 3 hours and is then poured into a mixture of chloroform and water. The aqueous layer is separated, acidified and extracted with chloroform. The dried chloroform extract yields, upon evaporation, crude 5-ethyldihydro-5-methyl-6-phenyl-1,3-oxazine-2,4(3H)-dione, melting point 140° C. to 178° C. Separation of the two racemic pairs is accomplished with the use of methanol to yield racemic pair A, melting point 191° C. to 193° C. and racemic pair B, melting point 129° C. to 131° C.

*Example VII*

To a solution of 182 parts by weight of ethyl 2-isopropyl-3-phenylhydracrylate in 700 parts by volume of chloroform, cooled to −15° C., there is added in succession with stirring, 76 parts by weight of phosgene and 145 parts by weight of antipyrine in 500 parts by volume of chloroform. The resulting clear solution is maintained at room temperature for 1 day and then evaporated to dryness under reduced pressure to yield a mixture of oil and crystals. The mass is extracted with dry ether and filtered to remove antipyrine hydrochloride. The ether solution, upon evaporation to dryness, gives the desired (2-carbethoxy-3-methyl-1-phenyl)butyl chloroformate as an oil. Treatment of 190 parts by weight of (2-carbethoxy-3-methyl-1-phenyl)butyl chloroformate dissolved in 500 parts by volume of chloroform, with dry ammonia at 15° C. to 20° C. to slight excess, followed by filtration of the precipitated ammonium chloride, gives a solution which, upon evaporation to dryness under reduced pressure, yields an oily solid consisting of the two racemic pairs corresponding to (2-carbethoxy-3-methyl-1-phenyl)-butyl carbamate.

To a solution of 4.9 parts by weight of the aforementioned carbamate in 30 parts by volume in dry methanol is added a solution of 4 parts by weight of sodium methoxide in 70 parts by volume of dry methanol. The resulting solution is kept at room temperature for 10 minutes and then evaporated to dryness under reduced pressure to give a crystalline residue containing the sodium salts of the two racemic pairs corresponding to dihydro-5-isopropyl-6-phenyl-1,3-oxazine-2,4(3H)-dione. An ice-cold mixture of water and chloroform is added to the solid residue and, after thorough shaking, the aqueous layer is separated and acidified to about pH 5. The resulting mixture is extracted with chloroform. The chloroform layer is dried with magnesium sulfate and evaporated to dryness to yield a mixture of the two racemic pairs corresponding to dihydro-5-isopropyl-6-phenyl-1,3-oxazine-2,4(3H)-dione. The mixture is fractionally crystallized from ethanol to yield racemic pair A, melting point 158° C. to 159° C. and racemic pair B, melting point 191° C. to 193° C.

*Example VIII*

To 72 parts by weight of zinc is slowly added at reflux temperature a solution of 116 parts by weight of benzaldehyde and 208 parts by weight of ethyl 2-bromovalerate in 280 parts by volume of benzene. After the final addition, the mixture is heated for a half-hour. The cooled mixture is decomposed with 10% sulfuric acid and the layers are separated. The dried benzene layer is concentrated under reduced pressure to yield an oil which gives, upon distillation, ethyl 3-phenyl-2-propylhyracrylate, boiling point 120° C. to 123° C. at 0.5 mm. pressure.

To 86 parts by weight of phosgene in 550 parts by volume of toluene at −20° C. is added a solution of 750 parts by volume of chloroform containing 206 parts by weight of ethyl 3-phenyl-2-propylhydracrylate and 164 parts by weight of antipyrine. The solution is permitted to stand for 3 days at room temperature. The filtrate is concentrated under reduced pressure to yield a mixture of solid and oil to which is added ether. After filtration of the antipyrine hydrochloride, the ethereal filtrate is evaporated to yield crude (2-carbethoxy-1-phenyl)amyl chloroformate.

To 230 parts by weight of (2-carbethoxy-1-phenyl)amyl chloroformate in 500 parts by volume of chloroform is added ammonia until a slight excess of ammonia is present. The mixture obtained is filtered and the filtrate is concentrated to yield crude (2-carbethoxy-1-phenyl)amyl carbamate, melting point 77° C. to 94° C.

To 5.0 parts by weight of (2-carbethoxy-1-phenyl)amyl carbamate in 25 parts by volume of methanol is added 4.0 parts by weight of sodium methoxide in 75 parts by volume of methanol. The solution is allowed to stand at room temperature for 20 minutes and is then added to a cold mixture of chloroform and water. The aqueous phase is separated, acidified and extracted with chloroform. The dry chloroform extract, upon evaporation, yielded dihydro-6-phenyl-5-propyl-1,3-oxazine-2,4(3H)-dione, melting point 116° C. to 124° C. Recrystallization from ethanol gave a product having a melting point of 129.5° C. to 130.5° C.

*Example IX*

To 183 parts by weight of zinc is slowly added, at reflux temperature, a solution of 500 parts by weight of ethyl 2-bromobutyrate and 242 parts by weight of valeraldehyde in 1800 parts by volume of benzene. To the cooled reaction mixture is added 10% sulfuric acid and the layers are then separated. The benzene layer is dried and evaporated under reduced pressure to yield an oil which gives ethyl 2-ethyl-3-hydroxyheptanoate upon distillation, boiling point 79° C. to 84° C. at 0.4 mm. pressure.

To 307 parts by weight of antipyrine in 1000 parts by volume of chloroform is added at −20° C. 175 parts by weight of phosgene and then 330 parts by weight of ethyl 2-ethyl-3-hydroxyheptanoate in 500 parts by volume of chloroform. The solution is allowed to stand at room temperature overnight and is then evaporated to dryness to yield a mixture of solid and oil. To this mixture is added ether and, after removing the antipyrine hydrochloride by filtration, the ethereal filtrate contains the crude 1-(1-carbethoxypropyl)amyl chloroformate.

To the ethereal filtrate which contains the crude 1-(1-carbethoxypropyl)amyl chloroformate, is added ammonia until a slight excess is present. The mixture is filtered and the filtrate is evaporated to yield an oily solid from which two racemic pairs corresponding to 1-(1-carbethoxypropyl)amyl carbamate are obtained by means of petroleum ether. Racemic pair A is a solid, melting point 61° C. to 63° C.; racemic pair B is an oil.

To 80 parts by weight of 1-(1-carbethoxypropyl)amyl carbamate (racemate A) in 350 parts by volume of methanol is added 18.5 parts by weight of sodium methoxide in 175 parts by volume of methanol. The solution is permitted to stand for 20 minutes at room temperature and is then poured into a mixture of water and chloroform. The aqueous layer is separated, acidified and extracted with chloroform. The dried chloroform extract yields 6-butyl-5-ethyldihydro-1,3-oxazine-2,4(3H)dione; racemic pair A, melting point 62° C. to 63.5° C. A similar treatment of racemic pair B, 1-(1-carbethoxypropyl)-amyl carbamate, as above, gives 6-butyl-5-ethyldihydro-1,3-oxazine-2,4(3H)-dione; racemic pair B, boiling point 147° C. to 151° C. at 0.3 mm. pressure.

*Example X*

A solution of 80 parts by weight of isocaproaldehyde and 156 parts by weight of ethyl α-bromoisobutyrate in 500 parts by volume of benzene is added to 52 parts by weight of zinc with stirring and gentle refluxing during a period of about 1 hour. When the reaction is complete, the mixture is decomposed with 10% sulfuric acid. The organic phase is dried and distilled to give ethyl 3-hydroxy-2,2,6-trimethylheptanoate, boiling point 85° C. to 100° C. at 0.5 mm. pressure. To 91 parts by weight of this substance, dissolved in 400 parts by volume of chloroform, is added, at −20° C. 55 parts by weight of phosgene. This is followed by the addition of 79.3 parts by weight of antipyrine dissolved in 266 parts by volume of chloroform. The mixture is stored at room temperature for about 4 days and is then evaporated to dryness under reduced pressure. The residual oily solid obtained is extracted with dry ether and filtered from antipyrine hydrochloride. The ether filtrate, containing the desired [1-(1-carbethoxy-1-methyl)ethyl-4-methyl]amyl chloroformate, is treated at 15° C. with dry ammonia to a slight excess. After filtration of the ammonium chloride and evaporation of the filtrate to dryness, a solid residue is obtained consisting of [1-(1-carbethoxy-1-methyl)ethyl-4-methyl]-amyl carbamate, melting point 52° C. to 58° C.

A solution of 5.2 parts by weight of the aforementioned carbamate in 10 parts by volume of methanol is treated with a solution of 1.1 parts by weight of sodium methoxide in 20 parts by volume of methanol. The resulting solution is stored at room temperature for 3 hours. This solution which contains the sodium salt of 5,5-dimethyldihydro-6-isoamyl-1,3-oxazine-2,4(3H)-dione is poured into a cold mixture of water and chloroform. After thorough mixing, the aqueous phase is separated and acidified to about pH 5. The mixture is extracted with chloroform. After drying and evaporation of the chloroform, a solid residue of 5,5-dimethyldihydro-6-isoamyl-1,3-oxazine-2,4(3H)-dione is obtained, melting point 110° C. to 111.5° C.

*Example XI*

A solution of 200 parts by weight of valeraldehyde and 408 parts by weight of ethyl α-bromoisobutyrate in 1500 parts by volume of benzene is added to 151 parts by weight of zinc with stirring and gentle refluxing during a period of about 1 hour. When the reaction is complete, the mixture is cooled in ice and hydrolyzed with 10% sulfuric acid. The organic phase is dried and distilled to give ethyl 2,2-dimethyl-3-hydroxyheptanoate, boiling point 73° C. to 85° C. at 0.05 mm. pressure.

To 1000 parts by volume of chloroform containing 205 parts by weight of ethyl 2,2-dimethyl-3-hydroxyheptanoate, is added 235 parts by weight of phosgene at −20° C. Following this, there is added a solution of 191 parts by weight of antipyrine in 500 parts by volume of chloroform. The resulting clear solution is stored at room temperature for 3 days and is then evaporated to dryness under reduced pressure. 1000 parts by volume of ether is added to the oily residue and the mixture is filtered from the precipitate of antipyrine hydrochloride. The ether filtrate, containing the desired [1-(1-carbethoxy-1-methyl)ethyl]amyl chloroformate is treated with gaseous ammonia at 20° C. until a slight excess is present. The precipitate of ammonium chloride is filtered and the filtrate is evaporated to dryness under reduced pressure to yield a solid residue of [1-(1-carbethoxy-1-methyl)ethyl]amyl carbamate. Upon recrystallization of this compound from petroleum ether, colorless crystals, melting point 61.5° C. to 63.5° C. are obtained.

To a solution of 100 parts by weight of [1-(1-carbethoxy-1-methyl)ethyl]amyl carbamate in 200 parts by volume of dry methanol is added 22 parts by weight of sodium methoxide dissolved in 300 parts by volume of methanol. The solution is permitted to stand at room temperature for about 20 minutes and is then added to an ice-cold mixture of water and chloroform. The aqueous phase, containing the sodium salt of 6-butyl-5,5-dimethyl-dihydro-1,3-oxazine-2,4(3H)-dione is acidified to about pH 5 and the resulting mixture is extracted with chloroform. The chloroform solution is dried and evaporated to yield a solid residue of 6-butyl-5,5-dimethyldihydro-1,3-oxazine-2,4(3H)-dione which, upon recrystallization from petroleum ether yields colorless crystals, melting point 76° C. to 77.5° C.

Example XII

To 110 parts by weight of zinc is slowly added, at reflux temperature, a solution of 334 parts by weight of ethyl 2-bromo-2-ethylbutyrate and 95 parts by weight of propionaldehyde in 600 parts by volume of benzene. After the final addition of reactant, the mixture is decomposed with 10% sulfuric acid in the cold. The layers are separated and the benzene layer is dried and concentrated under reduced pressure to yield an oil which gives, upon distillation, ethyl 2,2-diethyl-3-hydroxyvalerate, boiling point 91° C. to 101° C. at 0.3 mm. pressure. To 124 parts by weight of this substance in 600 parts by volume of dry chloroform is first added 70 parts by weight of phosgene at —25° C. and then 115 parts by weight of antipyrine in 300 parts by volume of chloroform. The solution is permitted to stand at room temperature for 24 hours and, upon evaporation, yields a mixture of oil and solid which is extracted with ether. Upon removal of the antipyrine hydrochloride, the ethereal filtrate contains the crude (2-carbethoxy-1,2-diethyl)-butyl chloroformate.

To the ethereal solution which contains 162 parts by weight of crude (2-carbethoxy-1,2-diethyl)butyl chloroformate is added ammonia until a slight excess is present. The mixture is filtered and the filtrate is concentrated to yield a yellow oil which, upon distillation, yields (2-carbethoxy-1,2-diethyl)butyl carbamate, boiling point 130° C. to 140° C. at 0.1 mm. pressure.

To 26.4 parts by weight of sodium methoxide in 500 parts by volume of methanol is added a solution of 60 parts by weight of (2-carbethoxy-1,2-diethyl)butyl carbamate in 150 parts by volume of methanol. The solution is permitted to stand at room temperature for about 7 hours and is then poured into a mixture of water and chloroform. The layers are separated and the aqueous layer is acidified and extracted with chloroform. The dried chloroform extract yields, upon evaporation, a solid product having a melting point of 63° C. to 93° C. which, upon recrystallization from ethanol, yields dihydro-5,5,6-triethyl-1,3-oxazine-2,4(3H)dione, melting point 102.5° C. to 104° C.

Example XIII

A solution of 491 parts by weight of isovaleraldehyde and 1056 parts by weight of ethyl α-bromobutyrate in 3000 parts by volume of dry benzene is added with stirring, under gently refluxing conditions, to 371 parts by weight of zinc during a period of about 1 hour. The reaction mixture is cooled in ice and hydrolyzed with 10% sulfuric acid. Distillation of the benzene layer gives a liquid of ethyl 2-ethyl-3-hydroxy-5-methylhexanoate; boiling point 78° C. to 85° C. at 0.5 mm. pressure. To a solution of 415 parts by weight of this substance in 1900 parts by volume of chloroform, cooled to —10° C., there is added 233 parts by weight of phosgene. Following this, there is added a solution of 385 parts by weight of antipyrine in 1500 parts by volume of chloroform. The clear reaction solution is kept at room temperature for 1 day and is then evaporated to dryness under reduced pressure. The residue is extracted with ether and the resulting precipitate of antipyrine hydrochloride is filtered. The ether filtrate, containing [1-(1-carbethoxypropyl)-3-methyl]butyl chloroformate is reacted with gaseous ammonia at 20° C. until a slight excess is present. After removal of the precipitate of ammonium chloride, the ether filtrate is evaporated to dryness to yield an oily solid consisting of two racemic pairs corresponding to [1-(1-carbethoxypropyl)-3-methyl]butyl carbamate.

To a solution of 100 parts by weight of the aforementioned mixture of racemic carbamates in 440 parts by volume of methanol, is added a solution of 22 parts by weight of sodium methoxide in 220 parts by volume of methanol. The solution is allowed to stand at room temperature for about 20 minutes and is then added to a cold mixture of water and chloroform. The aqueous phase, containing the sodium salts of both racemic pairs corresponding to 5-ethyldihydro-6-isobutyl-1,3-oxazine-2,4(3H)-dione is acidified to about pH 5 and the resulting mixture is extracted with chloroform. The chloroform solution is evaporated to yield a mixture of the two racemic pairs corresponding to 5-ethyldihydro-6-isobutyl-1,3-oxazine-2,4(3H)-dione. These are separated by means of fractional crystallization from petroleum ether to yield racemic pair A, melting point 49.5° C. to 51° C. and racemic pair B, melting point 84.5° C. to 87° C.

Example XIV

To 225 parts by weight of phosgene in 1000 parts by volume of chloroform at —20° C. is added a solution of 465 parts by weight of ethyl 2-ethyl-3-hydroxynonanoate and 382 parts by weight of antipyrine in 1500 parts by volume of chloroform. The solution is permitted to stand at room temperature for about 2 days and is then evaporated to yield a mixture of an oil and a solid to which is added ether. After removal of the antipyrine hydrochloride by filtration, the filtrate contains the crude 1-(1-carbethoxypropyl)-heptyl chloroformate. To this ethereal filtrate is added ammonia to a slight excess. The mixture is then filtered and upon evaporation of the filtrate under reduced pressure, the crude 1-(1-carbethoxypropyl)heptyl carbamate is obtained.

To 1.6 parts by weight of sodium methoxide in 60 parts by volume of methanol is added a solution of 2 parts by weight of 1-(1-carbethoxypropyl)heptyl carbamate in 35 parts by volume of methanol. The solution is permitted to stand for about 20 minutes at room temperature and is then poured into a mixture of chloroform and water. The layers are separated and the aqueous layer is acidified and extracted with chloroform. The dried chloroform extract yields, upon evaporation of the solvent, a solid product, melting point 56° C. to 61° C. which, upon recrystallization from benzene-petroleum ether (1:2), gives 5 - ethyl - 6 - hexyldihydro - 1,3-oxazine - 2,4(3H)-dione, melting point 62° C. to 63° C.

Example XV

Ethyl 2-bromobutyrate is reacted with 4-chlorobenzaldehyde and zinc under the conditions employed for a Reformatsky reaction (Organic Reactions, John Wiley & Sons, Inc., 1944, vol. 1, page 16) to give ethyl 2-ethyl-3(4-chlorophenyl)hydracrylate which is reacted with phosgene in accordance with the process described in Example V to give [2 - carbethoxy - 1 - (4 - chlorophenyl)]-butyl chloroformate. This compound, upon treatment with gaseous ammonia, yields [2 - carbethoxy - 1 - (4-chlorophenyl)]butyl carbamate which is reacted with sodium methoxide to give 6 - (4 - chlorophenyl) - 5 - ethyl-dihydro - 1,3 - oxazine - 2,4(3H)-dione.

Example XVI

Ethyl 2 - bromo - 3 - methylvalerate is reacted with 3-chlorobenzaldehyde and zinc under the conditions employed for a Reformatsky reaction (Organic Reactions, John Wiley & Sons, Inc., 1944, vol. 1, page 16) to give ethyl [3 - (3 - chlorophenyl) - 2 - (1 - methylpropyl)]-hydracrylate, which is reacted with phosgene in accordance with the process described in Example V to give [2-carbethoxy - 1 - (3 - chlorophenyl) - 3 - methyl]amyl chloroformate. This compound, upon treatment with gaseous ammonia, yields [2 - carbethoxy - 1 (3 - chlorophenyl) - 3 - methyl]amyl carbamate which is reacted with sodium methoxide to give 6 - (3 - chlorophenyl)di-hydro - 5 - (1 - methylpropyl) - 1,3 - oxazine - 2,4(3H)-dione.

Example XVII

Dihydro - 6 - (4 - isopropylphenyl) - 5 - methyl - 1,3-oxazine-2,4(3H)-dione is prepared in accordance with the procedure set forth in Example V by treating ethyl [3-(4 - isopropylphenyl) - 2 - methyl] hydracrylate with phosgene to yield [2 - carbethoxy - 1 - (4 - isopropylphenyl)]propyl chloroformate, which, upon treatment with gaseous ammonia, gives [2 - carbethoxy - 1 - (4-isopropylphenyl)]propyl carbamate. The latter compound is treated with sodium methoxide to yield dihydro-6 - (4 - isopropylphenyl) - 5 - methyl - 1,3 - oxazine - 2,4-(3H)-dione.

*Example XVIII*

Dihydro - 5,5 - dimethyldihydro - 6 - vinyl - 1,3 - oxazine - 2,4(3H) - dione is prepared in accordance with the process set forth in Example V by treatment of ethyl 2,2 - dimethyl - 3 - hydroxy - 4 - pentenoate with phosgene to yield (2 - carbethoxy - 2 - methyl - 1 - vinyl)propyl chloroformate, which, upon treatment with gaseous ammonia, gives (2 - carbethoxy - 2 - methyl - 1 - vinyl)propyl carbamate. The latter compound is treated with sodium methoxide to yield dihydro - 5,5 - dimethyl-dihydro - 6-vinyl - 1,3 - oxazine - 2,4(3H) - dione.

*Example XIX*

Ethyl α-bromobutyrate is reacted with phenylacetaldehyde and zinc under the conditions employed for a Reformatsky reaction (Organic Reactions, John Wiley & Sons, Inc., 1944, vol. 1, page 16) to give ethyl α-ethyl-β-hydroxy-γ-phenylbutyrate which is reacted with phosgene in accordance with the process set forth in Example V to give (1-benzyl-2-carbethoxy)butyl chloroformate. This compound, upon treatment with gaseous ammonia, yields (1-benzyl-2-carbethoxy)butyl carbamate which is reacted with sodium methoxide to give 6 - benzyl - 5-ethyldihydro - 1,3 - oxazine - 2,4(3H) - dione.

*Example XX*

Ethyl 2,2 - dimethyl - 3 - phenylhydracrylate is reacted with thiophosgene in accordance with the process set forth in Example V to yield (2 - carbethoxy - 2 - methyl-1 - phenyl)propyl chlorothioformate which, upon treatment with ammonia, yields (2 - carbethoxy - 2 - methyl-1 - phenyl)propyl thiocarbamate. The latter compound is treated with sodium methoxide to yield 5,5 - dimethyl-dihydro - 6 - phenyl - 2 - thio - 1,3 - oxazine - 2,4(3H)-dione.

*Example XXI*

(2 - carbethoxy - 2 - methyl - 1 - phenyl)propyl chloroformate is prepared as set forth in Example V and then reacted with methylamine to yield (2 - carbethoxy - 2-methyl - 1 - phenyl)propyl N-methylcarbamate. This compound is treated with sodium methoxide to yield dihydro - 6 - phenyl - 3,5,5 - trimethyl - 1,3 - oxazine - 2,4-(3H) - dione which has a melting point of 100° C. to 101° C.

*Example XXII*

Ethyl α-bromopropionate is reacted with β-phenylpropionaldehyde and zinc under the conditions employed for a Reformatsky reaction (Organic Reactions, John Wiley & Sons, Inc., 1944, vol. 1, page 16) to give ethyl 3 - hydroxy - 2 - methyl - 5 - phenyl-valerate which is reacted with phosgene in accordance with the process set forth in Example V to give [2 - carbethoxy - 1 - (2-phenyl-ethyl)]propyl chloroformate. This compound, upon treatment with gaseous ammonia, yields [2 - carbethoxy - 1 - (2 - phenylethyl)]propyl carbamate, which is reacted with sodium methoxide to give dihydro - 5-methyl - 6 - (2 - phenylethyl) - 1,3 - oxazine - 2,4(3H)-dione.

*Example XXIII*

Ethyl [2,2 - dimethyl - 3 - (4 - tolyl)]hydracrylate is treated with phosgene in accordance with the process set forth in Example V to yield [2 - carbethoxy - 2 - methyl-1 - (4 - tolyl)]propyl chloroformate which, upon treatment with gaseous ammonia yields [2 - carbethoxy - 2-methyl - 1 - (4 - tolyl)]propyl carbamate. This compound, on treatment with sodium methoxide, yields dihydro 5,5 - dimethyl - 6 - (4 - tolyl) - 1,3 - oxazine - 2,4-(3H) - dione.

*Example XXIV*

5,5 - dimethyl - 6,6 - dipropyldihydro - 1,3 - oxazine-2,4(3H) - dione is prepared in accordance with the procedure set forth in Example V by reacting ethyl 2,2 - dimethyl - 3 - hydroxy - 3 - propylhexanoate with phosgene to form [1 - (1 - carbethoxy - 1 - methyl)ethyl - 1 - propyl] butyl chloroformate, which is then treated with ammonia to yield [1 - (1 - carbethoxy - 1 - methyl)ethyl - 1-propyl]butyl carbamate. The latter is treated with sodium methoxide to yield 5,5 - dimethyl - 6,6 - dipropyldihydro - 1,3 - oxazine - 2,4(3H) - dione.

*Example XXV*

5,5-dimethyldihydro-6,6-pentamethylene - 1,3 - oxazine-2,4-(3H)-dione is prepared in accordance with the procedure set forth in Example V by reacting ethyl 1-hydroxy-α,α-dimethylcyclohexane-acetate with phosgene to form [1 - (1 - carbethoxy - 1 - methyl)ethyl] cyclohexyl chloroformate, which is then treated with ammonia to form [1-(carbethoxy-1-methyl)ethyl]cyclohexyl carbamate. The latter is treated with sodium methoxide to form 5,5-dimethyldihydro-6,6-pentamethylene - 1,3 - oxazine-2,4(3H)-dione.

*Example XXVI*

Ethyl 2-bromobutyrate is reacted with cyclohexanecarboxaldehyde and zinc under the conditions employed for a Reformatsky reaction (Organic Reactions, John Wiley & Sons, Inc., 1944, vol. 1, page 16) to give ethyl α-ethyl-β-hydroxycyclohexane propionate which is reacted with phosgene in accordance with the process described in Example V to yield (2-carbethoxy-1-cyclohexyl)butyl chloroformate. This compound, upon treatment with gaseous ammonia, yields (2-carbethoxy-1-cyclohexyl)-butyl carbamate, which is reacted with sodium methoxide to give 6-cyclohexyl-5-ethyldihydro-1,3-oxazine-2,4(3H)-dione.

*Example XXVII*

Ethyl 2-bromopropionate is reacted with thiophene-2-carboxaldehyde and zinc under the conditions employed for a Reformatsky reaction (Organic Reactions, John Wiley & Sons, Inc., 1944, vol. 1, page 16) to give ethyl β-hydroxy-α-methyl-2-thiophenepropionate which is reacted with phosgene in accordance with the process described in Example V to give [2-carbethoxy-1-(2-thienyl)]propyl chloroformate. This compound, upon treatment with gaseous ammonia, yields [2-carbethoxy-1-(2-thienyl)]propyl carbamate, which is reacted with sodium methoxide to give dihydro-5-methyl-6-(2-thienyl)-1,3-oxazine-2,4(3H)-dione.

*Example XXVIII*

Ethyl α-bromoisobutyrate is reacted with pyridine-2-carboxaldehyde and zinc under the conditions employed for a Reformatsky reaction (Organic Reactions, John Wiley & Sons, Inc., 1944, vol. 1, page 16) to give ethyl α,α-dimethyl-β-hydroxy-2-pyridinepropionate, which is reacted with phosgene in accordance with the process described in Example V to yield [2-carbethoxy-2-methyl-1-(2-pyridyl)]propyl chloroformate. This compound, upon treatment with gaseous ammonia, gives [2-carbethoxy-2-methyl-1-(2-pyridyl)]propyl carbamate which is reacted with sodium methoxide to yield dihydro-5,5-dimethyl-6-(2-pyridyl)-1,3-oxazine-2,4(3H)-dione.

*Example XXIX*

5 - ethyldihydro-6-propenyl-1,3-oxazine-2,4(3H)-dione is prepared in accordance with the procedure set forth in Example V by treatment of ethyl 2-ethyl-3-hydroxy-4-hexenoate with phosgene to form (2-carbethoxy-1-propenyl)butyl chloroformate, which, upon treatment with gaseous ammonia, yields (2-carbethoxy-1-propenyl) butyl carbamate. The latter compound, upon contact with sodium methoxide, gives 5-ethyldihydro-6-propenyl-1,3-oxazine-2,4(3H)-dione.

Example XXX

Ethyl α-bromoisobutyrate is reacted with 2-methylvaleraldehyde and zinc under the conditions employed for a Reformatsky reaction (Organic Reactions, John Wiley & Sons, Inc., 1944, vol. 1, page 16) to give ethyl 3-hydroxy-2,2,4-trimethyl heptanoate which is reacted with phosgene in accordance with the process described in Example V to give [1-(1-carbethoxy-1-methyl)ethyl-2-methyl]amyl chloroformate. This compound, upon treatment with gaseous ammonia yields [1-(1-carbethoxy-1-methyl)ethyl-2-methyl]amyl carbamate which is reacted with sodium methoxide to yield 5,5-dimethyldihydro-6-(1-methylbutyl)-1,3-oxazine-2,4(3H)dione.

Example XXXI

Ethyl 2-bromo-3-methylvalerate is reacted with propionaldehyde and zinc under the conditions employed for a Reformatsky reaction (Organic Reactions, John Wiley & Sons, Inc., 1944, vol. 1, page 16) to give ethyl [3-hydroxy-2-(1-methylpropyl)]valerate which is reacted with phosgene in accordance with the process described in Example V to give (2-carbethoxy-1-ethyl-3-methyl)-amyl chloroformate. This compound, upon treatment with gaseous ammonia, yields (2-carbethoxy-1-ethyl-3-methyl)amyl carbamate which is treated with sodium methoxide to yield 6-ethyldihydro-5-(1-methylpropyl)-1,3-oxazine-2,4(3H)-dione.

Example XXXII

Ethyl 2-bromobutyrate is reacted with 3-cyclohexene-1-carboxyaldehyde and zinc under the conditions employed for a Reformatsky reaction (Organic Reactions, John Wiley & Sons, Inc., 1944, vol. 1, page 16) to give ethyl α-ethyl-β-hydroxy-3-cyclohexene-1-propionate. The latter is reacted with phosgene in accordance with the process set forth in Example V to give [-carbethoxy-1-(3-cyclohexene-1-yl)]butyl chloroformate, which, upon treatment with gaseous ammonia, yields [2-carbethoxy-1-(3-cyclohexene-1-yl)]butyl carbamate. The latter compound is treated with sodium methoxide to give 6-(3-cyclohexene-1-yl)-5-ethyldihydro-1,3-oxazine-2,4(3H)-dione.

Example XXXIII (2-carbethoxy-2-ethyl-1-phenyl)butyl chloroformate, a product prepared in accordance with the process set forth in Example V is reacted with methylamine to give (2-carbethoxy-2-ethyl-1-phenyl)butyl-N-methyl carbamate. The latter compound is reacted with sodium methoxide to yield 5,5-diethyldihydro-3-methyl-6-phenyl-1,3-oxazine-2,4-dione. This product has a melting point of 103.5° C. to 104.5° C.

We claim:

1. A compound selected from the group consisting of those having the general formula:

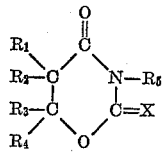

wherein $R_1$ and $R_2$ are members selected from the group consisting of hydrogen and lower alkyl radicals, $R_3$ and $R_4$ are members selected from the group consisting of hydrogen, lower alkyl, mononuclear aryl, mononuclear-aryl-lower-alkyl, lower alkenyl, chlorophenyl, tolyl, cyclohexyl, cyclohexenyl, pyridyl and thienyl radicals with the proviso that $R_1$, $R_2$, $R_3$ and $R_4$ may not all be hydrogen; $R_5$ is a member selected from the group consisting of hydrogen and lower alkyl radicals, and X is a member selected from the group consisting of oxygen and sulfur atoms, and the alkali metal salts thereof.

2. The dihydro-5,5-di-lower alkyl-6-mononuclear aryl-1,3-oxazine-2,4(3H)-diones.

3. The dihydro-5-lower alkyl-6-mononuclear aryl-1,3-oxazine-2,4(3H)-diones.

4. The new compound 5-ethyldihydro-6-phenyl-1,3-oxazine-2,4(3H)-dione.

5. The new compound 5-ethyldihydro-5-methyl-6-phenyl-1,3-oxazine-2,4(3H)-dione.

6. The new compound dihydro-5-isopropyl-6-phenyl-1,3-oxazine-2,4(3H)-dione.

7. The new compound 5,5-dimethyldihydro-6-isoamyl-1,3-oxazine-2,4(3H)-dione.

8. The new compound 3,5,5-trimethyldihydro-6-phenyl-1,3-oxazine-2,4-dione.

9. A method for preparing compounds having the general formula:

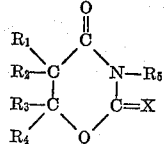

wherein $R_1$ and $R_2$ are members selected from the group consisting of hydrogen and lower alkyl radicals, $R_3$ and $R_4$ are members selected from the group consisting of hydrogen, lower alkyl, mononuclear aryl, mononuclear-aryl-lower-alkyl, lower alkenyl, chlorophenyl, tolyl, cyclohexyl, cyclohexenyl, pyridyl and thienyl radicals with the proviso that $R_1$, $R_2$, $R_3$ and $R_4$ may not all be hydrogen; $R_5$ is a member selected from the group consisting of hydrogen and lower alkyl radicals, and X is a member selected from the group consisting of oxygen and sulfur atoms, and the alkali metal salts thereof; which comprises reacting a compound having the general formula:

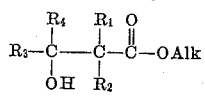

wherein Alk is a lower alkyl radical, with a member selected from the group consisting of phosgene and thiophosgene in the presence of a weak tertiary amine base and a member selected from the group consisting of chloroform and mixtures of chloroform and toluene at a temperature between —20° C. and 30° C. so as to form a compound having the general formula:

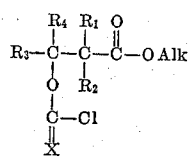

and reacting the compound so produced with a member selected from the group consisting of ammonia and a primary lower alkylamine so as to form a compound having the general formula:

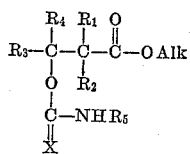

and then condensing the compound so produced by reaction with an alkali metal alkoxide.

No references cited.